UNITED STATES PATENT OFFICE 2,311,102

DOUBLY UNSATURATED KETONES AND PROCESS OF MAKING SAME

Albert Wettstein, Basel, Switzerland, assignor to Ciba Pharmaceutical Products, Incorporated, Summit, N. J., a corporation of New Jersey No Drawing. Application January 10, 1941, Serial No. 374,017. In Switzerland February 20, 1940

3 Claims. (Cl. 260—397.4)

It is known that $\alpha,\beta$-simply unsaturated ketones may be obtained by the action of ketones on $\beta,\gamma$-unsaturated alcohols in the presence of metal alcoholates or phenolates. Moreover, $\alpha,\beta:\gamma,\delta$-doubly unsaturated ketones have been obtained from $\beta,\gamma$-unsaturated secondary alcohols by adding two halogen atoms at the double bond, oxidizing the secondary carbinol group to the keto group and eliminating one molecule of hydrogen halide with caution and a second molecule energetically.

It has now been found that $\alpha,\beta:\gamma,\delta$-doubly unsaturated ketones may be obtained in a much simpler manner than by this many-staged process if $\beta,\gamma$-unsaturated secondary alcohols are treated with quinones in the presence of metal alcoholates or phenolates. It is assumed that, in this process, $\beta,\gamma$-unsaturated ketones are formed as intermediate products, for these substances also are converted into $\alpha,\beta:\gamma,\delta$-doubly unsaturated ketones by the action of the same reagents and therefore may be used as parent materials.

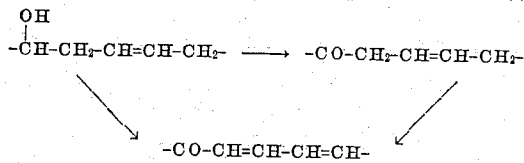

The carbinol group, which may be present in the parent material, is thus dehydrogenated by the action of the quinone to form a keto group, and hereupon a second double bond is introduced in the $\gamma,\delta$-position apparently in the same stage of the reaction in which the double bond in the $\beta,\gamma$-position shifts into the $\alpha,\beta$-position to the keto group by the action of the alcoholate or phenolate.

As parent materials for the new reaction not only aliphatic compounds are suitable but also aliphatic-aromatic, alicyclic or heterocyclic compounds. In the latter cases, the atom groupings noted above may be arranged in one or more rings; they may be substituted if desired.

The quinones which may be used—preferably in large excess—are, for example, benzoquinone and its derivatives, such as alkylated benzoquinones, chloranil, as well as higher quinones, such as quinizarine quinone. Metal alcoholates or phenolates to be used in the process are, for example, derived from aluminium, magnesium or zinc, such as aluminium isopropylate, aluminium tertiary butylate, aluminium phenolate or magnesium phenolate.

The reaction is preferably carried out with exclusion of water and in the presence of an inert solvent and/or diluent, for example of a hydrocarbon, such as benzene or toluene of an ether, like dioxane, or of pyridine. When the reaction is complete, the products, i. e., the $\alpha,\beta:\gamma,\delta$-doubly unsaturated ketone, the quinhydrone, excess quinone, the metal alcoholate or phenolate, as well as any possibly unchanged parent material, are separated by methods of themselves known, for example, by distillation, steam distillation, extraction with alkaline or acid agents, chromatography, recrystallization, or conversion into derivatives.

The following examples illustrate the invention but are not to be regarded as limiting it in any way:

Example 1

120 ccm. of anhydrous toluene are added to 2 gm. of $\Delta^5$-androstene-3t,17t-diol-17-monobenzoate and 12 gm. of pure quinone; about 20 ccm. of the solvent are removed by distillation in vacuo and 2 gm. of aluminium tertiary butylate are added. The mixture is now maintained for 45 minutes at the boil, with calcium chloride seal and under reflux, a green-black coloration (quinhydrone) being formed at once. The reaction mixture is then treated with steam for 4 hours, and the residue is exhaustively extracted with ether after addition of 10 ccm. of sulphuric acid of normal strength. The ethereal solution is repeatedly washed with soda solution of normal strength, then with water, and is then dried and evaporated in vacuo. The residue, a dark-colored grease, is taken up in benzene, and this benzene solution is then allowed to run through a column of 50 gm. of aluminium oxide, standardized according to Brockmann. The column is then eluated with a total quantity of 250 ccm. each of benzene, benzene-ether mixture 1:1 and ether; the extracts are united, evaporated in vacuo and yield thus directly a colorless crystalline mass which, on recrystallizing from ethyl acetate, yields at once pure 6-dehydro-testosterone-benzoate in the form of colorless needles, M. P. 257-260° C.

200 mg. of 6-dehydro-testosterone-benzoate are boiled for 2 hours under reflux with 20 ccm. of a solution of potassium hydroxide in methanol of 2 percent strength. Towards the end of the boiling period, the substance goes completely into solution. 200 ccm. of water is added, when a precipitate is formed; the reaction mixture is then made acid with sulphuric acid and the crystalline, yellow product is removed by filtering at the pump, washed with water, dried in a vacuum exsiccator and then taken up in ethyl acetate. This solution is decolorized by passing it through a column of aluminium oxide. The filtrate, on concentration, yields directly 6-dehydro-testosterone, M. P. 209–211° C. The product shows a strong absorption band in the ultra-violet at 2860Å (log ε max=4.47).

30 mg. of 6-dehydro-testosterone are dissolved in 2 ccm. of absolute pyridine and 1 ccm. of pure acetic anhydride, and the solution is allowed to stand overnight at room temperature. Water is added; the crystalline precipitate which forms is filtered off at the pump, washed with water and dried in the vacuum exsiccator. By recrystallization from hexane with the addition of a little acetone, magnificent, long needles, united together in tufts, are formed, having a M. P. 143–144° C. When mixed with testosterone-acetate they cause a marked lowering of the melting point and consist of 6-dehydro-testosterone-acetate.

Also, for example, sterols, like cholesterol, or cholenic-acid-derivatives, like the etio-cholenic-acid-esters, may be converted analogously into the corresponding 4,5:6,7-doubly unsaturated 3-ketones.

Example 2

180 ccm. of absolute toluene are added to 3 gm. of $\Delta^5$-pregnene-3-ole-20-one, together with 18 gm. of pure quinone; about 30 ccm. of the toluene is distilled in vacuo, and 3 gm. of aluminium tertiary butylate is added to the residue. The reaction mixture is maintained for one hour at the boil under reflux and with a calcium chloride seal, and it is then distilled with steam for 3 hours. 10 ccm. of sulphuric acid of normal strength is now added to the residue, which then is extracted thoroughly with ether. The united ethereal solutions are washed several times with normal solution of soda and then with water, after which they are dried and concentrated to about 50 ccm. This solution is now passed through a column of 80 gm. of aluminium oxide, which is then washed with a total quantity of 700 ccm. of ether.

The residue from the ethereal solutions, a colorless crystalline mass, still contains some pregnenolone, which is best separated by conversion into the succinic acid mono ester. To this end, the crystalline mass is boiled for 4 hours under calcium chloride seal with the same amount of succinic anhydride and 5 times the quantity of pyridine, after which a considerable quantity of ether is added, then soda solution of twice normal strength; the layers are separated and the ethereal layer is washed with dilute sulphuric acid and water, dried and evaporated to dryness in vacuo. In this manner a residue is obtained which, after sublimation at 140° C. under 0.02 mm. and recrystallization from hexane, yields pure 6-dehydro-progesterone of M. P. 147–148° C. The compound exhibits a maximum in the absorption spectrum at 2820Å (log ε max=4.40). When injected subcutaneously in quantities of 1.5 mg. into juvenile or castrated rabbits which have been pretreated with follicular hormone, it exhibits the typical action of progesterone and must therefore be included among the most active corpus luteum hormones.

In analogous manner, $\Delta^{4,5:6,7}$-androstadiene-3,17-dione may be obtained starting from dehydroandrosterone or androstene-3,17-diole. But also other alicyclic compounds like those of the ring-homo- and ring-nor-steroid, the terpene and poly-terpene series, further, aliphatic-aromatic or heterocyclic compounds are useful as starting materials, if they contain a β,γ-unsaturated ketone or secondary alcohol grouping.

Example 3

3 gm. of $\Delta^5$-21-acetoxy-pregnene-3-ole-20-one in about 150 ccm. of absolute toluene are allowed to react with 18 gm. of quinone and 3.0 gm. of aluminium tertiary butylate as described in Example 2. The reaction mixture is cooled and is sucked through a funnel containing a layer of aluminum oxide about 2 ccm. high. The funnel is thoroughly washed with ether and a little acetone, and the filtrate is distilled for 1 hour with steam. The residue is extracted exhaustively with ether, the united ethereal extracts are washed several times with a normal solution of soda and with water and are then evaporated in vacuo after drying. The residual grease is taken up in a mixture of 1 part petroleum ether and 3 parts benzene and is chromatographed by means of a column of aluminium oxide. A small quantity of a crystalline mass may be extracted with benzene and benzene-ether mixture 3:1 which, after recrystallization from hexane containing a little acetone, is obtained in the form of beautiful needles of M. P. 115–116° C. Both by analysis and ultra-violet absorption these prove to be 6-dehydro-desoxy-corticosterone-acetate. From the portion finally extracted with ether, a compound melting at an appreciably higher temperature—about 175° C. with decomposition—is obtained. The acetate described may be hydrolyzed, for example by means of a bicarbonate solution in alcohol and water, to the free 6-dehydro-desoxy-corticosterone.

In place of benzoquinone and aluminium tertiary butylate, for example, trimethyl-quinone and aluminium isopropylate or phenolate may be used in the above example, if desired in presence of another solvent and/or diluent. Instead of the 21-acetoxy compound there may be also used a compound having in 21-position another substituent convertible into hydroxyl with the aid of hydrolyzing agents, for example another 21-ester, like a 21-benzoxy, 21-propionyloxy, 21-halide or 21-diazo-compound, or furthermore a 21-ether. So quite generally $\Delta^{4,5:6,7}$-3,20-diketo-compounds of the pregnane series, containing in 21-position a member of the group consisting of hydroxyl and a substituent convertible into hydroxyl with the aid of hydrolyzing agents, may be obtained.

Example 4

400 mg. of $\Delta^5$-androstene-3-one-17t-ole-benzoate (with an unsharp melting point of 178–181° C.; prepared by the elimination of bromine from 5,6-dibromo-androstane-3-one-17t-ole-benzoate by means of zinc in ethanol) are oxidized with 3 gm. of quinone and 400 mg. of aluminium tertiary butylate in 25 ccm. of toluene and worked up according to the method used in Example 1. On chromatographic purification a crystalline mass is obtained which, after once recrystallization from ethyl acetate, is identical with 6-dehydro-testosterone benzoate according to its melting point and mixed melting point.

In analogous manner the end products of Examples 2 and 3 may be obtained, for example, by starting from the corresponding $\Delta^5$-3-ketones instead of from the $\Delta^5$-3-carbinols.

What I claim is:

1. Process for the manufacture of α,β:γ,δ-doubly unsaturated ketones, which comprises treating a member of the group β,γ-unsaturated ketones and β,γ-unsaturated secondary alcohols of the cyclopentanopolyhydrophenanthrene-series with quinones in the presence of a member of the group consisting of alcoholates and phenolates derived from one of the metals aluminum, zinc and magnesium.

2. Process for the manufacture of α,β:γ,δ-doubly unsaturated ketones, which comprises treating 5,6-unsaturated 3-hydroxy compounds of the 10,13-dimethyl-cyclopentanopolyhydrophenanthrene-series, containing in 17-position of the nucleus a member of the group —OH, —R, —COCH$_3$ and —COCH$_2$R, wherein R stands for a group convertible into hydroxyl with the aid of hydrolyzing agents, with quinones in the presence of a member of the group consisting of alcoholates and phenolates derived from one of the metals aluminum, zinc and magnesium.

3. A $\Delta^{4,5:6,7}$-3,20-diketo compound of the pregnane series, containing in 21-position a member of the group consisting of hydroxyl and a substituent convertible into hydroxyl with the aid of hydrolyzing agents.

ALBERT WETTSTEIN.